(No Model.)
W. G. FULLER & G. WINNER.
SCRAPER.
No. 578,558.  Patented Mar. 9, 1897.
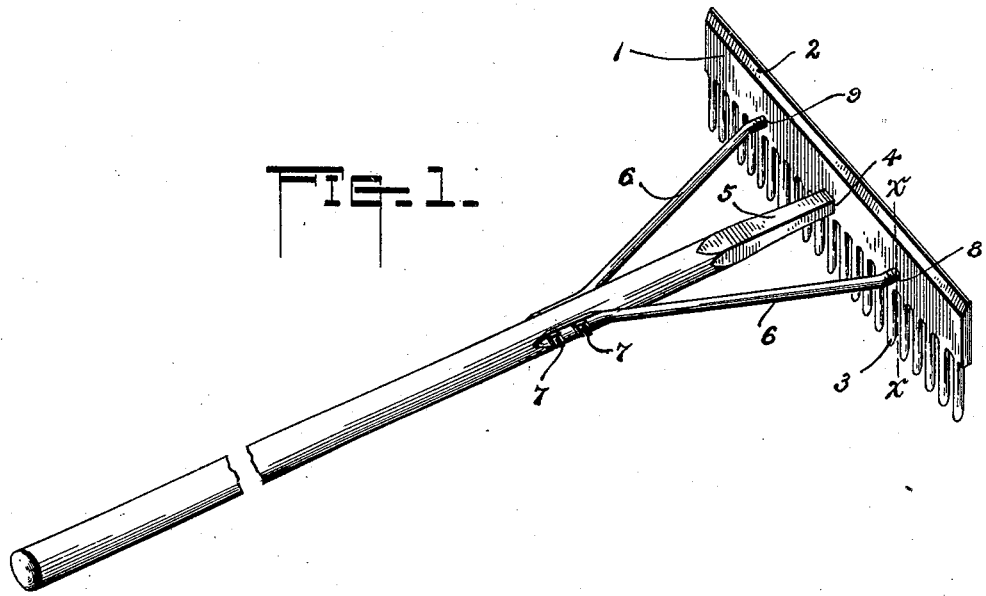
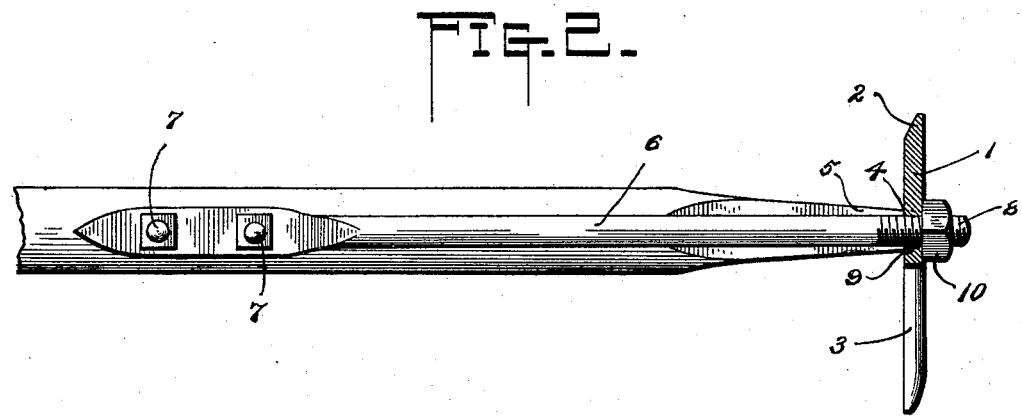
Witnesses
A. M. Poynton,
Wm. N. Cromwell.
Inventors
Wellington G. Fuller and
Grant Winner,
By their Attorneys,
C. A. Snow & Co.

UNITED STATES PATENT OFFICE.

WELLINGTON G. FULLER AND GRANT WINNER, OF WHITEHALL, WISCONSIN.

SCRAPER.

SPECIFICATION forming part of Letters Patent No. 578,558, dated March 9, 1897.

Application filed March 25, 1896. Serial No. 584,845. (No model.)

*To all whom it may concern:*

Be it known that we, WELLINGTON G. FULLER and GRANT WINNER, citizens of the United States, residing at Whitehall, in the county of Trempealeau and State of Wisconsin, have invented a new and useful Scraper, of which the following is a specification.

This invention relates to improvements in scrapers; and it has for its object to provide an implement of this character combining in its construction both a scraper and a rake, and also improved means whereby the head of the implement may be secured to the handle thereof in order to render the same easily tightened, thus permitting any wear being readily compensated for.

To these ends the invention consists substantially in the combination and arrangement of parts, as will be hereinafter more fully illustrated, described, and claimed.

In the accompanying drawings, Figure 1 is a perspective view of a scraper constructed in accordance with the present invention. Fig. 2 is a transverse sectional view on the line X X, Fig. 1.

Similar numerals of reference indicate corresponding parts throughout the figures.

Referring to the drawings, 1 designates the head of a scraper formed of any suitable material and provided with an integral scraping edge 2, the opposite side of the head being formed with a series of rake-teeth 3.

At a point midway the ends of the head 1 a polygonal opening 4 is formed, such opening being adapted to receive one end of a handle 5, made polygonal and tapered so as to conform to the opening 4. At opposite sides of the handle 5 divergent brace-rods 6 are disposed, the inner end of each of the brace-rods being provided with an attachment-plate and secured to the handle by means of bolts 7 or their equivalents and the outer end of the brace-rods being provided with threads 8. The threaded ends 8 are curved, as clearly shown, and pass through openings 9 in the head 1, in which they are secured by means of nuts 10 mounted thereon, said nuts bearing against the outer side of the head, whereby such head may be easily tightened upon the handle when the same has become loose.

From the foregoing it will be obvious that to employ the herein-described implement as a scraper it is simply necessary to rotate the handle in order to permit the edge 2 to rest upon the ground or floor, when such implement may be employed for scraping purposes. As a rake the position of the head will be inverted so that the raking-teeth 3 may be on the under side, and thereby are placed in a position for use. If at any time the head 1 should become loosened upon the handle 5, the nuts 10 are screwed upon the threaded ends 8 of the brace-rods 6, by which such head 1 is forced farther upon the tapered end of the handle and tightened thereon.

Having thus described our invention, what we claim is—

A combined rake and scraper comprising a straight handle provided with a tapering square end, a detachable head provided with a longitudinal scraping edge and having rake-teeth at the opposite edge, the diverging braces arranged in the same plane as the handle and having their outer ends bent parallel to the handle threaded and passing through perforations of the detachable head, said braces being flattened and perforated at their opposite ends, bolts passing through the perforations and the handle for permanent attachment thereto, and nuts arranged on the threaded ends of the braces and engaging the outer face of the head to force the latter inward on the tapering end of the handle, substantially as and for the purpose described.

In testimony that we claim the foregoing as our own we have hereto affixed our signatures in the presence of two witnesses.

WELLINGTON G. FULLER.
GRANT WINNER.

Witnesses:
E. N. TROWBRIDGE,
ANTON ANETLY.